United States Patent
Adachi et al.

(10) Patent No.: US 9,702,765 B2
(45) Date of Patent: Jul. 11, 2017

(54) PAIRED TEMPERATURE SENSOR AND METHOD OF MANUFACTURING THE SAME

(71) Applicant: DENSO CORPORATION, Kariya, Aichi (JP)

(72) Inventors: Tomohiro Adachi, Chiryu (JP); Tsunenobu Hori, Kariya (JP); Kazuhiro Inoguchi, Toyota (JP)

(73) Assignee: DENSO CORPORATION, Kariya (JP)

( * ) Notice: Subject to any disclaimer, the term of this patent is extended or adjusted under 35 U.S.C. 154(b) by 407 days.

(21) Appl. No.: 14/151,400

(22) Filed: Jan. 9, 2014

(65) Prior Publication Data

US 2014/0198826 A1    Jul. 17, 2014

(30) Foreign Application Priority Data

Jan. 11, 2013    (JP) .................. 2013-003578

(51) Int. Cl.
*G01K 7/00*    (2006.01)
*G01K 7/22*    (2006.01)
(Continued)

(52) U.S. Cl.
CPC ............... *G01K 7/22* (2013.01); *G01K 1/026* (2013.01); *G01K 1/14* (2013.01); *Y10T 29/49085* (2015.01)

(58) Field of Classification Search
CPC .......... G01K 7/22; G01K 7/20; G01K 13/002; G01K 1/083; H01C 1/1406
(Continued)

(56) References Cited

U.S. PATENT DOCUMENTS 5,255,149 A * 10/1993 Matsuo .................. G01K 3/005
    307/117
5,798,685 A *  8/1998 Katsuki ................ H01C 1/1406
    29/610.1
(Continued)

FOREIGN PATENT DOCUMENTS

JP    4-271229    9/1992
JP    08-241802   9/1996
(Continued)

OTHER PUBLICATIONS

NGK Spark Plug, Method for manufacturing temperature sensor and method for inspecting the same, JP 2007218871.*
(Continued)

*Primary Examiner* — Michael A Lyons
*Assistant Examiner* — Nigel Plumb
(74) *Attorney, Agent, or Firm* — Nixon & Vanderhye PC

(57) ABSTRACT

A paired temperature sensor includes two temperature sensors having electrical characteristics substantially equivalent at the same temperature range, each of the temperature sensor having a thermosensitive element therein that changes its electrical characteristics according to temperature, and a pair of lead wires, and a single connector 3 to which the two temperature sensors are connected via the lead wires. The two temperature sensors have electrical characteristics substantially equivalent at the same temperature range. The connector has positioning portions for allowing the connector to be connected in a predetermined orientation relative to a counterpart connector. There is provided at least one distinguishing difference between the two temperature sensors.

9 Claims, 14 Drawing Sheets

(51) Int. Cl.
*G01K 1/02* (2006.01)
*G01K 1/14* (2006.01)

(58) Field of Classification Search
USPC ............... 374/183, 163, 188, 100; 29/612
See application file for complete search history.

(56) References Cited

U.S. PATENT DOCUMENTS

| | | |
|---|---|---|
| 6,188,307 B1 | 2/2001 | Katsuki et al. |
| 6,261,480 B1* | 7/2001 | Ogata ................. C01G 23/003 |
| | | 252/500 |
| 6,740,261 B1* | 5/2004 | Ogata .................. C04B 35/016 |
| | | 252/500 |
| 2007/0107418 A1* | 5/2007 | Colignon ............... F01N 3/106 |
| | | 60/295 |
| 2008/0025372 A1* | 1/2008 | Culbertson ............. G01K 1/08 |
| | | 374/185 |

FOREIGN PATENT DOCUMENTS

| | | |
|---|---|---|
| JP | 10-321408 | 12/1998 |
| JP | 2000-241259 | 9/2000 |
| JP | 2007-218871 | 8/2007 |
| JP | 2010-530540 | 9/2010 |
| JP | 2011-106465 | 6/2011 |
| JP | 2012-155443 | 8/2012 |
| JP | 2012-199085 | 10/2012 |

OTHER PUBLICATIONS

Office Action (2 pages) dated Nov. 25, 2014, issued in corresponding Japanese Application No. 2013-003578 and English translation (3 pages).

* cited by examiner

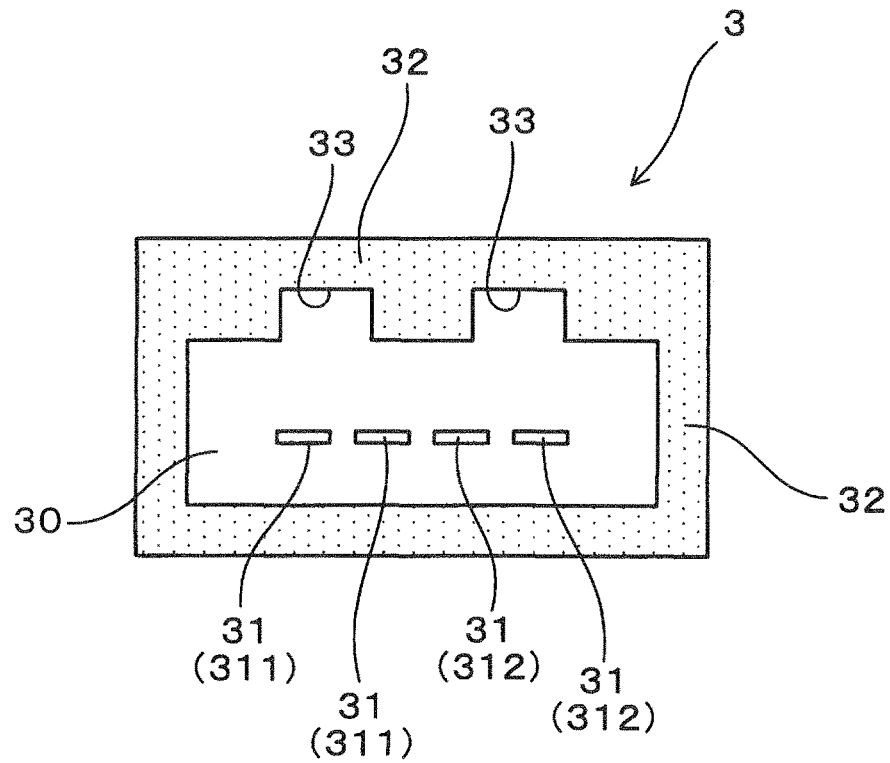
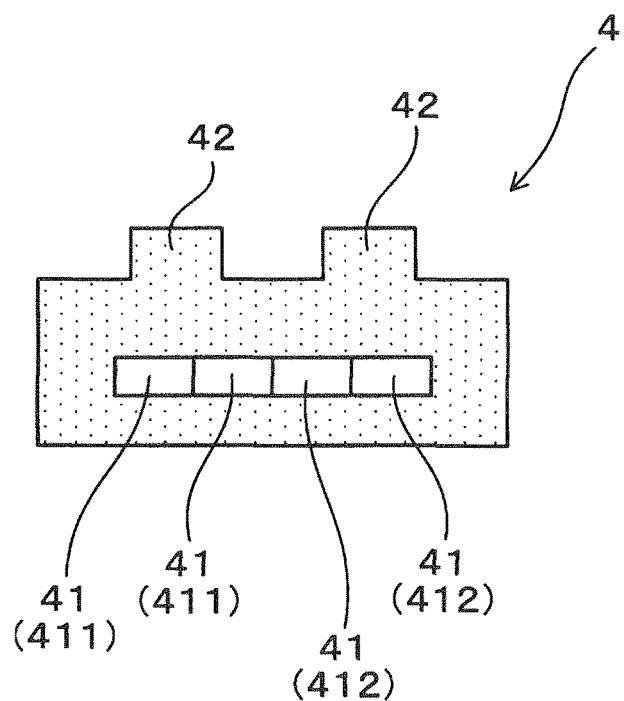

PAIRED TEMPERATURE SENSOR AND METHOD OF MANUFACTURING THE SAME

CROSS-REFERENCE TO RELATED APPLICATION

This application is based on and claims the benefit of priority from earlier Japanese Patent Application No. 2013-3578 filed Jan. 11, 2013, the description of which is incorporated herein by reference.

TECHNICAL FIELD

The present disclosure relates to a paired temperature sensor integrated by connecting two temperature sensors to a single connector, and a method of manufacturing the same.

BACKGROUND

For example, there is a temperature sensor disposed in an exhaust system of a vehicle that measures the temperature of the exhaust gas.

The temperature sensor has a built-in thermosensitive element that changes its electrical characteristics with the temperature.

A paired temperature sensor integrated by connecting two of such temperature sensors to a single connector is proposed (refer to Japanese Translation No. 2010-530540 of PCT International Application, for example).

For example, the paired temperature sensor may be used by placing a pair of the temperature sensors respectively upstream and downstream of a catalytic converter for exhaust gas purification.

Thereby, it is possible to confirm the state of deterioration of catalyst in the catalytic converter based on the difference between the values measured by the pair of the temperature sensors.

However, even though the electrical characteristics for the temperature of the pair of the temperature sensors (thermosensitive element) in the above paired sensor are exactly the same, the temperature differences between the two measured objects becomes reversed if the paired sensor is attached to the vehicle or the like in a wrong way (for example, attached to a reverse position with respect to the catalytic converter), thus the information cannot be transmitted accurately.

Further, even if the paired sensor is attached to the vehicle or the like correctly without any mistake, the temperature differences between the two measured objects becomes reversed in the same way if lead wires of the paired temperature sensor are connected to a wrong destination when connecting the paired sensor to the controller side, thus the information cannot be transmitted accurately.

Furthermore, if the electrical characteristics for the temperature of the pair of the temperature sensors (thermosensitive element) in the paired temperature sensor are significantly different, it is impossible to accurately measure the temperature differences between the two measured objects of the paired temperature sensor.

On the other hand, there is a possibility that variation occurs in the electrical characteristics with respect to the temperature in the thermosensitive element due to the manufacturing variations.

That is, it is difficult to make the electrical characteristics for the temperature exactly the same, and there is a possibility that two thermosensitive elements selected arbitrarily may output different output values for the same temperature, for example.

However, a problem arises that the temperature differences between the two measured objects cannot be measured accurately as described above if a large difference occurs between the electrical characteristics of the thermosensitive elements in the two temperature sensors that constitute a single paired temperature sensor.

Thus, for example, there is a possibility that it is not possible to accurately measure the temperature difference between the upstream side and the downstream side of the catalytic converter, and therefore accurate catalyst deterioration determination becomes difficult.

In addition, although it is conceivable to assume that the pair of the temperature sensors having the thermosensitive elements have a difference in the electrical characteristics that are below a predetermined value, in a product after inspecting the entire paired temperature sensor after manufacturing, it is impossible to increase product yield and it is difficult to obtain high production efficiency.

Further, if the lead wires are connected to wrong positions during attaching the lead wires of the paired temperature sensor to a single connector, the temperature difference between the two measured objects becomes reversed similarly, thus the information cannot be transmitted accurately.

SUMMARY OF THE DISCLOSURE

An embodiment provides a paired temperature sensor that can measure a temperature difference between two measured objects accurately, and a method of manufacturing the same efficiently.

In a paired temperature sensor according to a first aspect, the paired temperature sensor includes two temperature sensors having electrical characteristics substantially equivalent at the same temperature range, each of the temperature sensor having a thermosensitive element therein that changes its electrical characteristics according to temperature, and a pair of lead wires, a single connector to which the two temperature sensors are connected via the lead wires, positioning portions for allowing the connector to be connected in a predetermined orientation relative to a counterpart connector, and at least one distinguishing difference between the two temperature sensors.

Since the paired temperature sensor has the two temperature sensors having electrical characteristics substantially equivalent at the same temperature range, it is possible to accurately measure the temperature differences between the two measured objects.

Further, since the connector is provided with the positioning portions, erroneous connection between the connector and the counterpart connector is prevented, and signals of the two temperature sensors can be properly connected to predetermined connecting lines corresponding to each signal of the two temperature sensors.

Further, since the two temperature sensors are provided with the difference that distinguishes each other, it is possible to prevent false assemblies when mounting the two temperature sensors respectively on predetermined positions of the vehicle or the like.

That is, it is possible to prevent incorrect assembly where one of the temperature sensors is assembled to a position where the other one of the temperature sensors should be assembled, thus each of the two temperature sensors is assembled to the predetermined position correctly.

As described above, according to the present disclosure, a paired temperature sensor can be provided that can promote assembly of the two temperature sensors constituting the paired sensor in the predetermined positions correctly, that can measure the temperature differences between the two measured objects accurately, and that can be connected to the vehicle or the like through one connector.

In the paired temperature sensor according to a second aspect, indicated temperature differences relative at the same temperature of the two temperature sensors are less than 5 degrees C. in a measured temperature range of at least more than or equal to 200 degrees C. and less than or equal to 850 degrees C.

In the paired temperature sensor according to a third aspect, the thermosensitive element is a thermistor element whose electrical resistance varies according to the temperature.

In the paired temperature sensor according to a fourth aspect, the difference of the two temperature sensors is a difference in lengths of the lead wires.

In the paired temperature sensor according to a fifth aspect, the two temperature sensors are different in the shape of a nipple that is for fastening the temperature sensor to a measuring point.

In the paired temperature sensor according to a sixth aspect, the two temperature sensors are different in a marking with an identifiable appearance marked at least on one of the temperature sensors.

In the paired temperature sensor according to a seventh aspect, the two temperature sensors are provided with different optical reading code marked on the temperature sensor.

In addition, a QR CODE (a registered trademark of Denso Wave Incorporated), or bar code, etc. can be used as the optical reading code, for example.

In a method of manufacturing a paired temperature sensor integrated by connecting two temperature sensors each having a thermosensitive element that change their electrical characteristics with the temperature therein and a pair of lead wires to a single connector via the lead wires according to an eighth aspect, the method includes steps of an element manufacturing step where a plurality of thermosensitive elements are manufactured, a classification step where the plurality of the thermosensitive elements are classified into a plurality of classes by differences in electrical characteristics for a given temperature, a selection step where two thermosensitive elements are selected arbitrarily from the same class among the plurality of classes, and an assembling step where the paired temperature sensor is assembled using the two thermosensitive elements selected in the selection step.

The method of manufacturing the paired temperature sensor includes the classification step and the selection step.

Thereby, it is possible to manufacture the paired temperature sensor in the assembling step by using the pair of thermosensitive elements with similar electrical characteristics among the plurality of the thermosensitive elements manufactured in the element manufacturing.

Therefore, the electrical characteristics of the thermosensitive elements in the pair of the temperature sensor can be made close in a single paired temperature sensor.

As a result, it is possible to measure accurately the temperature differences between the two measured objects by the pair of the temperature sensors.

Further, since the classification step and the selection step are performed, it is possible to improve the yield of the obtained paired temperature sensors during the manufacturing process, thus production efficiency can be improved.

In the method of manufacturing a paired temperature according to a ninth aspect, the classification step is performed at a stage before disposing the thermosensitive element into the temperature sensor.

In the method of manufacturing a paired temperature according to a tenth aspect, the plurality of the thermosensitive elements is classified into more than four classes in the classification step according to the differences of combinations of electrical characteristics for each of two different given temperatures.

As mentioned above, according to the present disclosure, the paired temperature sensor that can measure the temperature differences between the two measured objects accurately, and the method of manufacturing the same efficiently can be provided.

BRIEF DESCRIPTION OF THE DRAWINGS

In the accompanying drawings:

FIG. 6A shows a cross-sectional view of a base end portion of a connector in the third embodiment;

FIG. 6B shows a cross-sectional view of a counterpart connector in the third embodiment;

DETAILED DESCRIPTION OF THE PREFERRED EMBODIMENTS

With reference to the drawings, hereinafter will be described embodiments of the present disclosure.

First Embodiment

Figure 1:
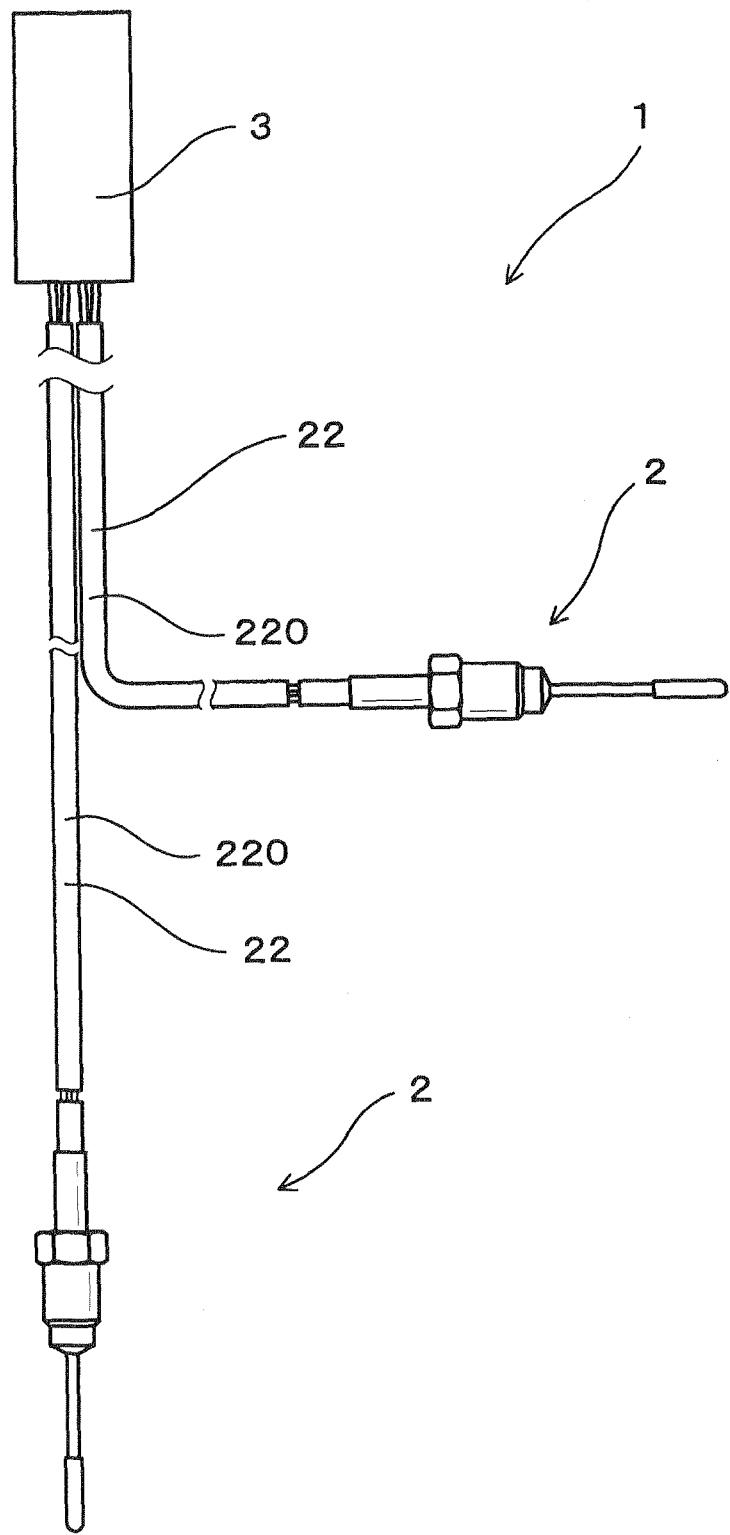
FIG. 1 shows an overall view of a paired temperature sensor in a first embodiment.
Figure 2:
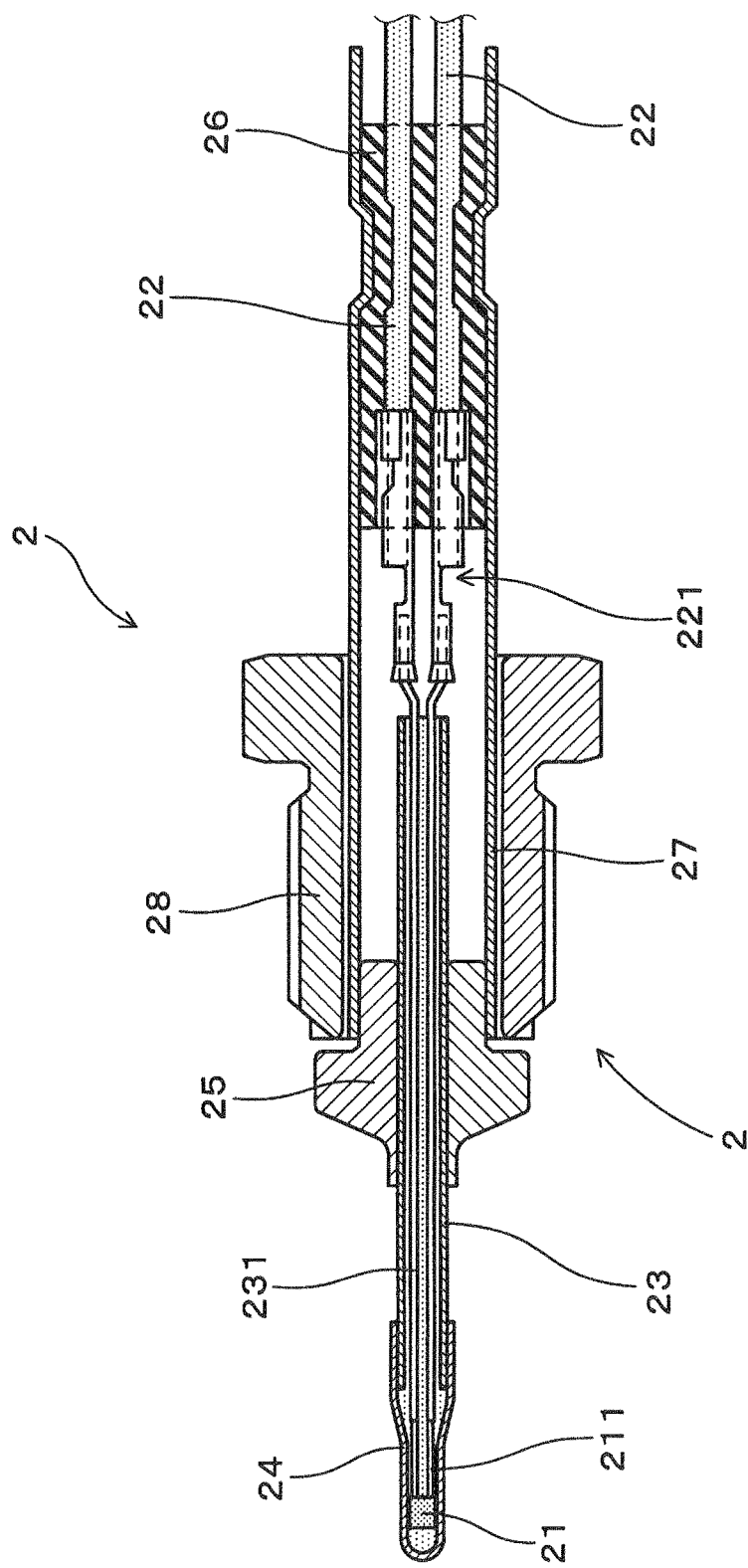
FIG. 2 shows a cross-sectional view of the temperature sensor in the first embodiment.

As shown FIG. 1 and FIG. 2, a method of manufacturing a paired temperature sensor is a method for manufacturing an integrated paired temperature sensor 1 by connecting two temperature sensors 2 to a single connector 3 via lead wires 22.

As shown in FIG. 2, each of the temperature sensor 2 has a thermosensitive element 21 therein that changes its electrical characteristics according to temperature, and has a pair of lead wires 22.

The method of manufacturing the paired temperature sensor has an element manufacturing step, a classification step, a selection step, and an assembling step.

In the element manufacturing step, a plurality of thermosensitive elements 21 is manufactured.

In the classification step, the plurality of the thermosensitive elements 21 is classified into a plurality of classes by differences in electrical characteristics for a given temperature.

In the selection step, two thermosensitive elements 21 are selected arbitrarily from the same class among the plurality of classes.

In the assembling step, the paired temperature sensor 1 is assembled using the two thermosensitive elements 21 selected in the selection step.

The plurality of the thermosensitive elements 21 may be classified into two classes, or may be classified into three or more classes.

In the present embodiment, the thermosensitive element 21 is a thermistor element whose electrical resistance varies according to the temperature.

Here, by using the thermosensitive elements 21 having similar electrical resistance characteristics according temperature for the pair of temperature sensor 2, it is possible to obtain the paired temperature sensor 1 efficiently with excellent measurement accuracy.

In addition, a thermometric resistor consists of platinum (Pt) or the like, or a thermocouple, for example, may be used as the thermosensitive element 21 other than the thermistor.

Further, when using the thermocouple as the thermosensitive element 21, the electrical characteristics are the voltage (electromotive force, or e. m. f.).

Furthermore, as shown in FIG. 2, distal ends of a pair of signal lines 231 supported in a sheath pin 23 are connected to a pair of electrode wires 211 provided on the thermosensitive element 21.

Moreover, the lead wires 22 are connected the pair of signal lines 231 via connecting members 221 at a base end of the sheath pin 23.

Further, the temperature sensor 2 has an element protective cover 24 that covers the thermosensitive element 21 from a distal end side thereof.

A base end portion of the element protective cover 24 is welded to an outer periphery of the sheath pin 23.

In the present specification, a side where the thermosensitive element 21 is provided is defined as the distal end side, and a side opposite to the distal end side is defined the base end side.

The sheath pin 23 is supported from the outer peripheral side by a rib 25.

Further, the connecting members 221 for connecting the sheath pin 23 and the lead wires 22 are supported by a supporting member 26.

Furthermore, a protective tube 27 is disposed on an outer peripheral side of the supporting member 26.

The rib 25 is fixed to the distal end portion of the protective tube 27.

Further, a nipple 28 for mounting the paired temperature sensor 1 to a vehicle or the like is provided on an outer periphery of the protective tube 27 in the base end side of the rib 25.

The temperature sensor 2 is formed to protrude the pair of the lead wires 22 towards the base end side.

Then, as shown in FIG. 1, the two temperature sensors 2 are integrated by connecting the lead wires 22 of each thereof to the single connector 3 to configure the paired temperature sensor 1 of the present embodiment.

In addition, the pair of the lead wire 22 is covered by wire tubes 220 except for their ends.

When manufacturing the plurality of the paired temperature sensors 1 as mentioned above, first, the plurality of the thermosensitive elements 21 are manufactured in the element manufacturing step.

The thermosensitive element 21 is manufactured in a condition where the pair of the electrode wires 211 are fixed.

Further, the thermosensitive element 21 may be manufactured in a condition of being sealed with a sealing material made of glass or the like.

In the classification step, the plurality of the thermosensitive elements 21 obtained in such a way is classified into several classes according to the differences in the electrical characteristics for the given temperature.

Since the thermistor is used as the thermosensitive element 21 in the present embodiment, the thermosensitive elements 21 are classified into the plurality of classes by the difference in the electrical resistance for the given temperature.

Specifically, for example, an electrical resistance $R_n$ of a thermosensitive element 21 at a given temperature $T$ is measured for each of the plurality of the thermosensitive elements 21.

Here, even if the thermosensitive element 21 is manufactured with a target value of the electric resistance value $R_n$ of the thermosensitive element 21 at a temperature $T$ set to $R_s$, variation occurs in the individual electrical resistance $R_n$ of the thermosensitive element 21 due to manufacturing variations.

Then, the electrical resistance $R_n$ is classified into one of either $R_n > R_{max}$, $R_{max} >= R_n >= R_s$, $R_s > R_n >= R_{min}$, or $R_{min} > R_n$.

Here, $R_{max}$ is an upper limit of a standard value of the electric resistance value $R_n$, and $R_{min}$ is a lower limit of the standard value of the electric resistance value $R_n$.

Therefore, the thermosensitive element 21 that matches either $R_{min} > R_n$ or $R_n > R_{max}$ is treated as nonstandard, and is not adopted as a product.

Figure 3:
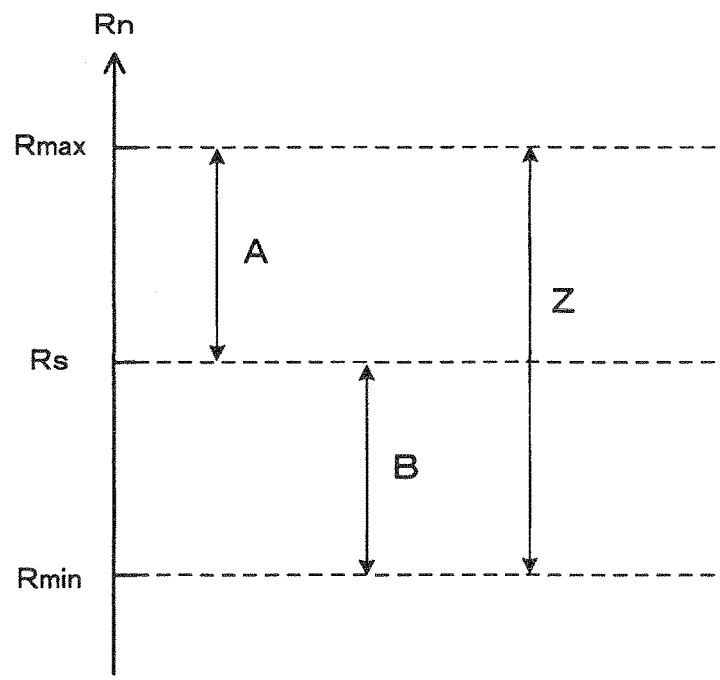
FIG. 3 shows a diagram for explaining a classification in the first embodiment.

That is, the thermosensitive element 21 that satisfies $R_{max} >= R_n >= R_{min}$ is adopted as a product with sufficient quality, and as shown in FIG. 3, the thermosensitive elements 21 are classified into class A that is a class that satisfies $R_{max} >= R_n >= R_s$ and class B that is a class that satisfies $R_s > R_n >= R_{min}$.

FIG. 3 shows ranges of the resistance values $R_n$ that the thermosensitive element 21 of class A and the thermosensitive element 21 of class B can have with respect to the given temperature $T$, respectively, with the electrical resistance $R_n$ of the thermosensitive element 21 at the given temperature $T$ as a vertical axis.

In other words, a range expressed by a bidirectional arrow A in the figure is the range that the electrical resistance $R_n$ of the thermosensitive element 21 of class A can express with respect to the given temperature $T$, and a range expressed by a bidirectional arrow B in the figure is the range of the electrical resistance Rn that the thermosensitive element 21 of class B can express with respect to the given temperature T.

Accordingly, the classification step is performed at a stage before putting the thermosensitive element 21 into the temperature sensor 2.

Thereby, it is possible to reliably match the two thermosensitive elements 21 selected in the selection step when assembling the paired temperature sensor 1 in the assembling step.

That is, by performing the classification step at the stage before putting the thermosensitive element 21 into the temperature sensor 2, it is possible to provide an identification (described later) to the temperature sensor 2 with the classified thermosensitive element 21 therein or a sub-assembly at a stage before the pair of the temperature sensors 2 is integrated.

Thus, it is possible to prevent erroneous assembling in the assembling step.

Here, the given temperature T may be, for example, 850 degrees C. (Celsius).

The given temperature T is appropriately set based on the temperature range of the measured objects of the paired temperature sensor 1.

Further, the Rmax and Rmin may be set to about Rmax=1.1Rs, and Rmin=0.9Rs, for example.

Next, two thermosensitive elements 21 are selected arbitrarily from the same class and set as a pair of the thermosensitive elements 21 in the selection step.

That is, for example, two thermosensitive elements are selected from class A and paired, or two thermosensitive elements 21 are selected from class B and paired.

On the contrary, the thermosensitive elements 21 are not selected from both class A and class B together to make a pair.

As a result, the pairs consisting of the thermosensitive element 21 of class A only and pairs consisting of the thermosensitive element 21 of the class B only are obtained.

Next, a single paired temperature sensor 1 shown in FIG. 1 is manufactured using the pair of the thermosensitive elements 21 in the assembling step.

That is, first, the temperature sensor 2 is assembled along with other components, such as connecting the electrode wires 211 of the thermosensitive element 21 to the signal lines 231 of the sheath pin 23 (refer to FIG. 2).

Further, two temperature sensors 2 are integrated by connecting lead wires 22 thereof to the single connector 3 to obtain the single paired temperature sensor 1 in the assembling step.

That is, the two pairs of the lead wires 22 are connected respectively to two pairs of terminals provided in the connector 3.

Since the terminals to be paired in the four terminals are fixed in the connector 3, it is necessary that the pair of lead wires 22 of the single temperature sensor 2 is connected to the paired two terminals.

That is, erroneous connection that one each of the lead wires 22 of the different temperature sensor 2 is connected to the two terminals that are paired must be reliably prevented.

Therefore, it is preferred to provide a means for preventing erroneous connection of the 22 lead wires, such as providing a partition plate between the pair of terminals and the other pair of terminals, for example (refer to a third embodiment described later).

Through the above steps, the plurality of the paired temperature sensors 1 is obtained.

Note that the classification step may be performed immediately after the element manufacturing step, or the classification step may be performed after the element manufacturing step with other steps therebetween.

That is, in the classification step, the thermosensitive elements 21 can also be classified as they are by examining the electrical characteristics manufactured in the element manufacturing step.

Further, in the classification step, the temperature sensor or the sub-assembly thereof may be assembled using the thermosensitive elements 21 manufactured in the element manufacturing step, and may be classified by examining the electrical characteristics in the state of the temperature sensor or the sub-assembly.

The paired temperature sensor 1 obtained can be used, for example, to measure the temperature difference between the upstream side and downstream side of the catalytic converter in the exhaust system of the vehicle.

That is, one of the temperature sensors 2 of the paired temperature sensor 1 is disposed in the upstream side of the catalytic converter, and the other one of the temperature sensors 2 is disposed in the downstream side of the catalytic converter.

Thus, the temperature in the upstream side and the temperature in the downstream side of the catalytic converter can be measured by the pair of the temperature sensors 2.

The temperature information detected by the pair of the temperature sensors 2 is transmitted to a control section such as an ECU (engine control unit) from the lead wires 22 through the connector 3.

Then, it is possible to determine the deterioration state of the catalyst of the catalytic converter based on the difference between the temperatures detected by the pair of the temperature sensors 2.

For example, in a case where the temperature difference between the temperatures detected by the pair of the temperature sensors 2 is greater than a predetermined value, the catalyst is active enough, thus it is possible to determine that the catalyst is not deteriorated.

On the other hand, in a case where the temperature difference is less than the predetermined value, the catalyst is not activated sufficiently, thus it is possible to determine that the catalyst is deteriorated.

Next, functions and effects of the present embodiment are explained.

The method of manufacturing the paired temperature sensor has the classification step and the selection step.

Thereby, it is possible to manufacture the paired temperature sensor 1 in the assembling step by using the pair of the thermosensitive element 21 with similar electrical characteristics among the plurality of the thermosensitive elements 21 manufactured in the element manufacturing.

Therefore, the electrical characteristics of the thermosensitive elements 21 in the pair of the temperature sensor 2 can be made close in the single paired temperature.

As a result, it is possible to measure accurately the temperature differences between the two measured objects by the pair of the temperature sensors 2.

That is, since the two thermosensitive elements 21 are selected from either one of the classes A and B to make a pair in the classification step when assembling the paired temperature sensor 1, the electrical characteristics thereof can be closer to each other between the pair of the thermosensitive elements 21.

That is, as can be seen from FIG. 3, the difference between the electrical resistances Rn is Rmax–Rs, at most, between the thermosensitive elements 21 in class A.

Further, the difference between the electrical resistances Rn is Rs–Rmin, at most, between the thermosensitive elements 21 in class B.

In contrast, assuming that there is no classification step and the selection step, as shown in a comparative example described later, the difference in the electrical resistance Rn may become Rmax–Rmin at most.

Therefore, it is possible to halve the difference between the electrical resistances Rn for the given temperature T of the thermosensitive element 21 as the pair by performing the above selection step and the classification step.

As a result, it is possible to improve the measurement accuracy of the temperature differences between the two measured objects by the pair of the temperature sensors 2.

Further, since the classification step and the selection step are performed, it is possible to improve the yield of the obtained paired temperature sensors 1 during the manufacturing process, thus production efficiency can be improved.

In particular, by performing the classification step at the stage before putting the thermosensitive element 21 into the temperature sensor 2, the two thermosensitive elements 21 selected in the selection step can be combined reliably during assembling the paired temperature sensor 1 in the assembling step.

As described above, according to the present embodiment, the method of efficiently manufacturing the paired temperature sensor that can measure temperature difference between two measured objects accurately can be provided.

Comparative Example

This is an example of a manufacturing method of the paired temperature sensor in the absence of the selection step and the classification step that are in the manufacturing method of the paired temperature sensor according to the first embodiment.

That is, in the present example, a paired temperature sensor is assembled by choosing any two out of a plurality of thermosensitive elements obtained in an element manufacturing step.

Therefore, two thermosensitive elements are selected as a pair arbitrarily from the mixture of the thermosensitive element of class A and thermosensitive elements of the class B in the first embodiment.

As shown in FIG. 3, some of the mixture of the thermosensitive element of class A and thermosensitive elements of the class B may have the electrical resistance Rn at the given temperature T at any value in a range Rmin~Rmax (bidirectional arrow Z).

Therefore, when the two thermosensitive elements are selected arbitrarily from the mixture to make a pair, the difference in the electrical resistance Rn for the given temperature T of the two may become Rmax–Rmin, at most.

In this case, in the paired temperature sensor having such two thermosensitive elements as the pair, the accuracy of the temperature difference detected by the pair of the temperature sensors is reduced.

In contrast, according to the paired temperature sensor 1 in the first embodiment, as described above, the differences in electrical resistance Rn of the pair of the temperature sensor 2 for the given temperature T fit into either Rmax–Rs or Rs–Rmin, at most.

Therefore, it is possible to improve the measurement accuracy of the temperature difference by the paired temperature sensor 1.

It should be appreciated that, in the second embodiment and the subsequent embodiments, components identical with or similar to those in the first embodiment are given the same reference numerals, and structures and features thereof will not be described in order to avoid redundant explanation.

Second Embodiment

Figure 4:
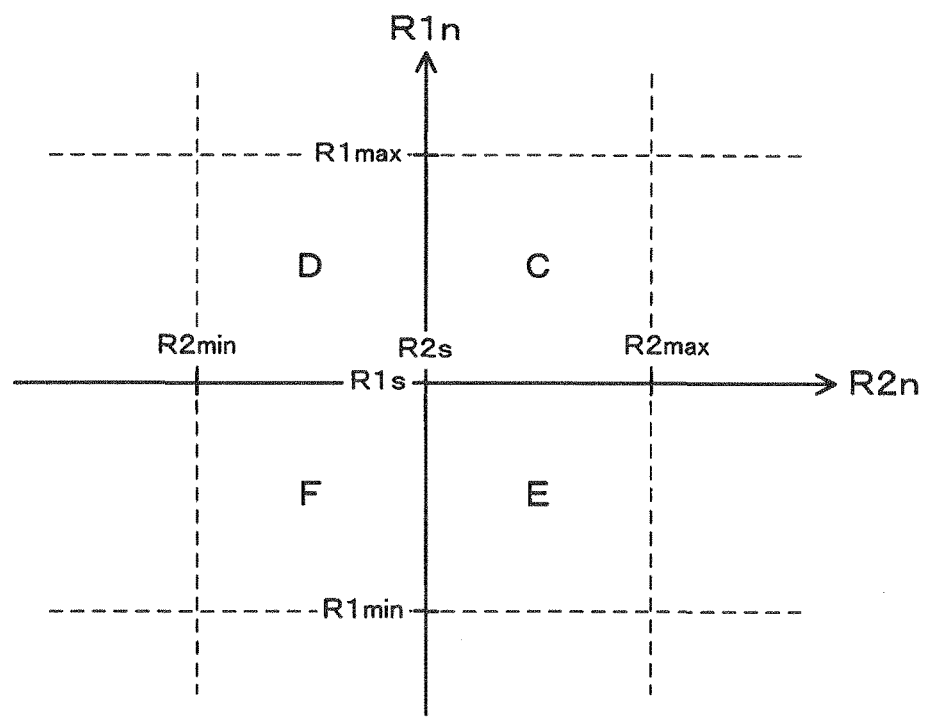
FIG. 4 shows a diagram for explaining a classification in a second embodiment.

As shown in FIG. 4, the present embodiment is an example where the plurality of the thermosensitive elements 21 is classified into more than four classes in the classification step according to the differences of combinations of electrical characteristics for each of two different given temperatures T1, T2.

That is, in the classification step, for each of the plurality of the thermosensitive element 21, the electrical resistance R1n for the given temperature T1 and the electric resistance value R2n for the other given temperature T2 are measured.

Then, any thermosensitive element 21 that matches to any one of R1n>Rmax, Rmin>R1n, R2n>Rmax, or Rmin>R2n, is treated as nonstandard, and is not adopted as a product.

In other words, R1max and R2max are the upper limits of the standard values of each electrical resistance R1n and R2n, and R1 min and R2 min are the lower limits of the standard values of each electrical resistance R1n and R2n.

Therefore, the thermosensitive element 21 that satisfies R1max>=R1n>=R1 min and R2max>=R2n>=R2 min is adopted as a product with sufficient quality.

Then, the thermosensitive elements 21 are classified into four classes C, D, E, and F as shown in FIG. 4.

The class C is a class that satisfies R1max>=R1n R1s and R2max>=R2n>=R2s.

The class D is a class that satisfies R1max>=R1n>=R1s and R2s>R2n>=R2 min.

The class E is a class that satisfies R1s>R1n>=R1 min and R2max>=R2n>=R2s.

The class F is a class that satisfies R1s>R1n>=R1 min and R2s>R2n>=R2 min.

Here, R1s is a target value of the electrical resistance of the thermosensitive element 21 at the temperature T1, and R2s is another target value of the electrical resistance of the thermosensitive element 21 at the temperature T2.

The two given temperatures T1 and T2 may be T1=200 degrees C. and T2=850 degrees C., for example.

Although the given temperatures T1 and T2 are appropriately set based on the temperature range of the measured object of the paired temperature sensor 1 or the like, it is desirable that the difference between T1 and T2 is sufficiently large.

Then, the two thermosensitive elements 21 are selected arbitrarily from the same class among the four classes C, D, E, and F in the selection step.

Further, the paired temperature sensor 1 is assembled using the two thermosensitive elements 21 of the same class in the assembling step.

Other details are the same as in the first embodiment.

In the classification step, since the electrical characteristics for each given temperature can be divided into at least two for each, the thermosensitive elements 21 are classified into more than four classes, as described above, however, it can also be classified into six, eight, or nine classes, for example.

However, it can be said that when considering the effect of improving the temperature difference measurement accuracy of the paired temperature sensor 1 and the likelihood of erroneous assembly and complexity of the classification, the class divided into four classes is particularly preferred.

Further, it is also possible to classify according to the differences in combinations of the electrical characteristics for each of three or more given temperatures.

However, for the same reason as above, two given temperatures are preferred rather than three or more.

In the present embodiment, it is possible to obtain the paired temperature sensors with excellent measurement accuracy in a wide range of the temperature.

That is, although the electrical resistance of the thermosensitive element 21 varies according to the temperature, a deviation amount between the target value and the electrical resistance may also vary according to the temperature.

That is, there is a case that even if the electrical resistance R1n at the temperature T1 is smaller than the target value, R1s, the electrical resistance R2n at the temperature T2 may be greater than the target value R2s, for example.

Thus, in the classification step, when the classification is performed using only the electrical resistance R1n at the temperature T1, even though the measurement accuracy of the temperature difference of the two measured objects by the paired temperature sensor 1 is high in the vicinity of the temperature T1, it may be possible that the measurement accuracy is lowered in the vicinity of the temperature T2, for example.

Therefore, by using the electrical characteristics (electrical resistance) of the thermosensitive element 21 at the two given temperatures T1, T2, and classifying the thermosensitive elements 21 into four classes, the detection accuracy of the difference of the temperature between the two measured object is possible to improve in a wide range of the temperature.

Other functions and effects are the same as those of the first embodiment.

Third Embodiment

Figure 5:
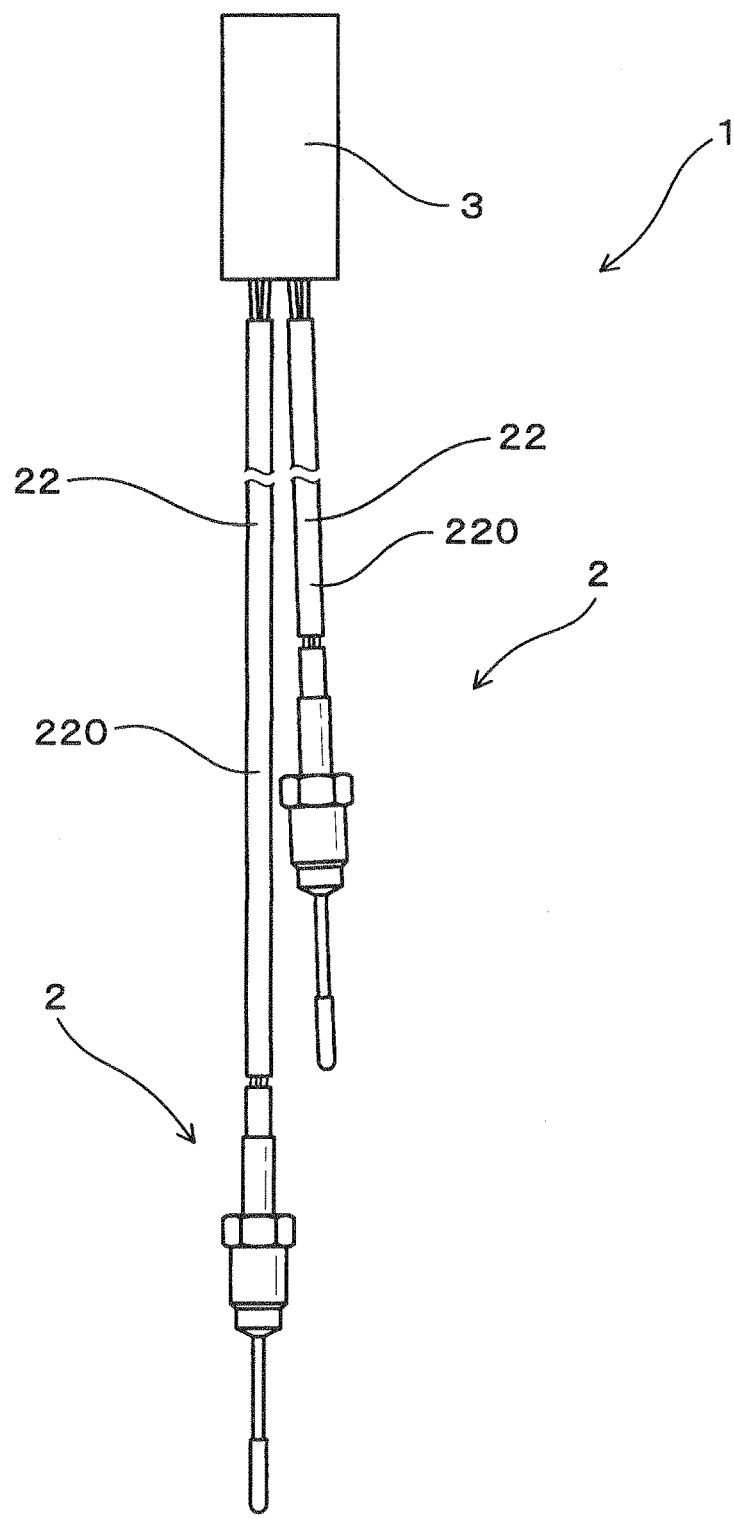
FIG. 5 shows an overall view of a paired temperature sensor in a third embodiment.

As shown in FIGS. 5-7, the present embodiment is an example of a paired temperature sensor 1 that is integrated by connecting two temperature sensors 2 to a single connector 3 via lead wires 22, and the two temperature sensor 2 of the paired temperature sensor 1 are provided with at least one distinguishing difference between the two.

The two temperature sensors 2 of the paired temperature sensor 1 have substantially equivalent electrical characteristics at the same temperature range.

Such a paired temperature sensor 1 can be obtained by the manufacturing method of the paired temperature sensor according to the first embodiment or the second embodiment.

The connector 3 has positioning portions for allowing the connector 3 to be connected in a predetermined orientation relative to a counterpart connector 4.

In the present embodiment, the positioning portions are key grooves 33 described below.

Then, there is provided with at least one distinguishing difference between the two temperature sensors 2, as described above.

In the present embodiment, as shown in FIG. 5, the difference is a difference in lengths of the lead wires 22.

This can be said that the difference in the lengths of the wire tubes 220 that cover the pair of the lead wires 22.

Indicated temperature differences relative to the same temperature of the two temperature sensors 2 are less than 5 degrees C. in the measured temperature range of at least more than or equal to 200 degrees C. and less than or equal to 850 degrees C.

That is, in the above temperature range, when assuming that the measured objects having the same temperature are measured by the two temperature sensors 2, the indicated temperatures indicated by the each temperature sensors 2 are the same and the difference between them is less than 5 degrees C.

The thermosensitive element 21 in the present embodiment is also a thermistor.

Other basic configuration of the temperature sensor 2 is the same as that of the first embodiment.

Further, as shown in FIG. 6A and FIG. 6B, a shape of a base end portion of the connector 3, which is a connected side to the counterpart connector 4, has a shape to be connected only in a predetermined orientation relative to the counterpart connector 4.

As shown in FIG. 6A, the connector 3 has four protruding terminals 31 of which are electrically connected to the two pairs of the lead wires 22.

The base end portion of the connector 3 has four side wall portions 32, and an opening recess 30 that opens toward the base end side is formed on an inner side of the side wall portions 32. In addition, four protruding terminals 31 are disposed in the opening recess 33.

Two protruding terminals 311 among the four protruding terminal 31 are electrically connected to one of the temperature sensors 2 of the paired temperature sensor 1, and other two protruding terminals 312 are electrically connected to the other one of the temperature sensors 2.

Then, two key grooves 33 are formed on one of the side walls 32 among the four side walls 32 in the opening recess 32 side.

The key grooves 33 are formed in parallel with a connecting direction of the connector 3 and the counterpart connector 4.

Further, as shown in FIG. 6B, the counterpart connector 4 is formed in a shape corresponding to the shape of the base end portion of the connector 3.

In other words, the counterpart connector 4 has four terminal holes 41 to which the four protruding terminals 31 are fitted.

Two terminal holes 411 among the four terminal holes 41 are to be electrically connected to one of the temperature sensors 2 of the paired temperature sensor 1, and terminal holes 412 are to be electrically connected to the other one of the temperature sensors 2.

Further, key protrusions 42 that mesh with the key grooves 33 are formed on one of sides of the counterpart connector 4.

Figure 7A:
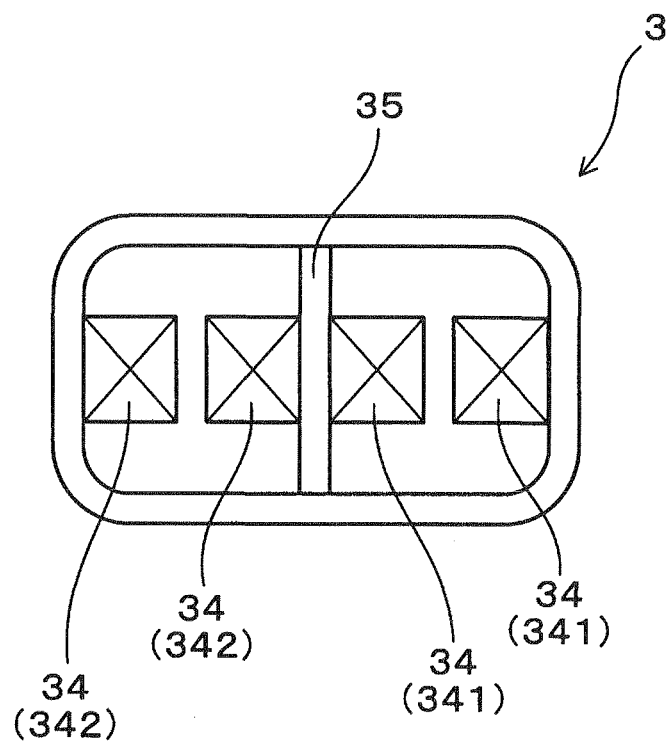
FIG. 7A shows a plan view of a distal end portion of the connector in the third embodiment.
Figure 7B:
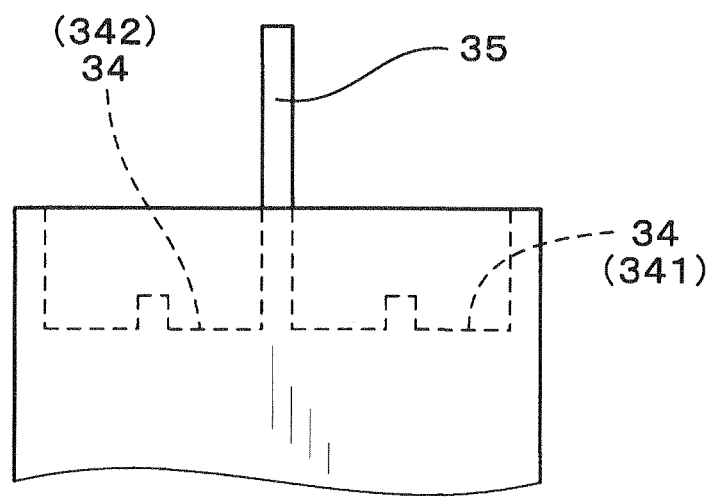
FIG. 7B shows a side view of the distal end portion of the connector in the third embodiment.

Furthermore, as shown in FIG. 7A and FIG. 7B, the connector 3 has four distal end side terminals 34 on a distal end portion of the connector 3 where the lead wires 22 are connected.

Each of the distal end side terminals 34 is electrically connected to each of the protruding terminals 31, respectively, in the connector 3

Two distal end side terminals 341 among the four distal end side terminals 34 are connected to the lead wires of one of the temperature sensors 2 of the paired temperature sensor 1 and other two distal end side terminals 342 are connected to the lead wires 22 of the other one of the temperature sensors 2.

Further, a partition plate 35 is formed between the two distal end side terminals 341 and the other two distal end side terminals 342.

Accordingly, upon assembling the paired temperature sensor 1, when connecting the lead wires 22 of the two temperature sensors 2 to the connector 3, the lead wires 22 of one of the temperature sensors 2 and lead wires 22 of the other one of the temperature sensors 2 are disposed on both sides of the partition plate 35.

That is, with a presence of the partition plate 35, the two pairs of the lead wires 22 to be connected to the connector 3 will not be jumbled together with each other, and they are likely to be placed in predetermined positions.

The pair of the lead wires 22 of the pair of the temperature sensors 2 may be connected to any one of the two distal end side terminals 34 that are not separated from each other by the partition plate 35.

Because the thermosensitive element 21 is a thermistor, there is no polarity to a pair of electrodes in the present embodiment.

This situation is the same even when a thermometric resistor such as a platinum thermometric resistor, for example, is used as the thermosensitive element 21.

In contrast, when a thermocouple is used as a thermosensitive element 21, each of the lead wires 22 of the pair of the temperature sensors 2 must be connected to predetermined distal end side terminals 34, both lead wires 22 being interchanged must be prevented.

Other details are the same as in the first embodiment.

Since the paired temperature sensor 1 of the present embodiment has the two temperature sensors 2 having electrical characteristics substantially equivalent at the same temperature range, it is possible to accurately measure the temperature differences between the two measured objects.

Further, since the connector 3 is provided with the positioning portions (key grooves 33), erroneous connection between the connector 3 and the counterpart connector 4 is prevented, and signals of the two temperature sensors 2 can be properly connected to predetermined connecting lines corresponding to each signal of the two temperature sensors 2.

In other words, when attempting to connect the connector 3 in a state of rotating 180 degrees about an axial direction with the counterpart connector 4, the key protrusions 42 of the counterpart connector 4 interfere with the side wall portion 32 of the connector 3.

Therefore, the connector 3 and the counterpart connector 4 are connected to each other in the correct orientation reliably.

As a result, the two temperature sensors 2 are reliably connected to predetermined terminals to be connected, respectively, of the control section such as the ECU.

Further, the two temperature sensors 2 are provided with the difference that distinguishes each other (difference in lengths of the lead wires 22).

Therefore, when mounting the two temperature sensors 2 respectively on predetermined positions of the vehicle or the like, it is possible to prevent false assemblies.

That is, it is possible to prevent incorrect assembly where one of the temperature sensors 2 is assembled to a position where the other one of the temperature sensors 2 should be assembled, thus each of the two temperature sensors 2 is assembled to the predetermined position correctly.

For example, in a case where the measured objects are the upstream side temperature and the downstream side temperature of the catalytic converter, respectively, the temperature sensor 2 to be mounted on the upstream side of the catalytic converter (hereinafter, the first temperature sensors 2) and the other temperature sensor 2 to be mounted on the downstream side of the catalytic converter (hereinafter, the second temperature sensors 2) can be easily identified.

Therefore, it is possible to prevent false assemblies, such as reversing the mounting positions, when assembling the temperature sensors 2 to an exhaust system of the vehicle.

In addition, the indicated temperature differences relative to the same temperature of the two temperature sensors 2 are less than 5 degrees C. in the measured temperature range of at least more than or equal to 200 degrees C. and less than or equal to 850 degrees C.

Therefore, it is possible to increase the measurement accuracy of the temperature differences between the two measured objects at a sufficient temperature range.

Further, the difference of the two temperature sensors 2 is the difference in lengths of the lead wires 22. Therefore, an easily recognizable difference can easily be provided.

As described above, according to the present embodiment, the paired temperature sensor that can assemble the two temperature sensors constituting the paired sensor in the predetermined positions correctly, that can measure the temperature differences between the two measured objects accurately, and that can be connected to the vehicle or the like through one connector can be provided.

Fourth Embodiment

The present embodiment is an example that the difference of the two temperature sensors 2 is a difference in a shape of the nipple 28 that is for fastening the temperature sensor to a measuring point, as shown in FIGS. 8A-8D and FIGS. 9A-9C.

As shown in FIG. 2, the nipple 28 is a component where the protective tube 27 is inserted inside the nipple 28 and supported, and as shown in FIGS. 8 and 9, the nipple 28 has a threaded portion 281 and a hexagonal portion 282 on its outer peripheral surface.

Thereby, it is configured so that the threaded portion 281 is screwed to a female screw portion provided in the measuring point to fix the temperature sensor 2 to the measuring point.

Then, the difference in the shape of the nipple 28 in the two temperature sensors 2 may be a thread diameter of the threaded portion 281, a thread pitch, or axial length, etc., for example.

Figure 8A:
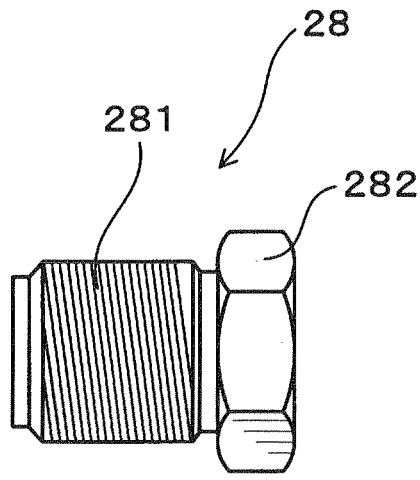
FIGS. 8A-8D show side views of four nipples having differences in threaded portions in a fourth embodiment.
Figure 8B:
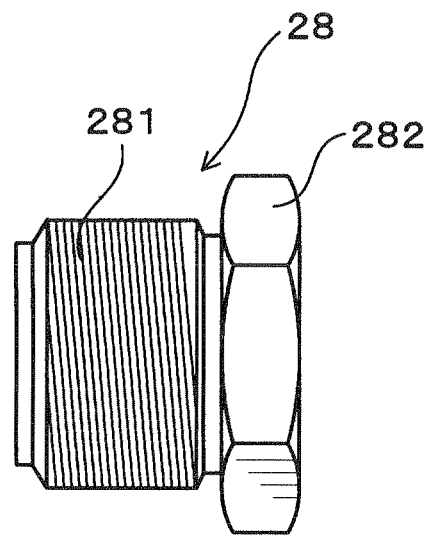
Figure 8C:
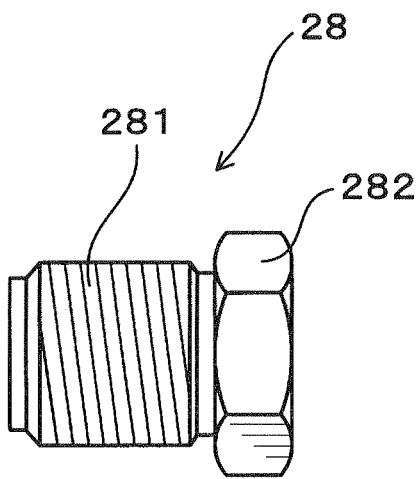
Figure 8D:
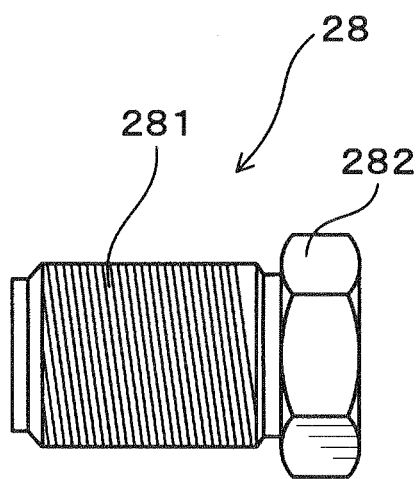

That is, when assuming that the first temperature sensor 2 has a nipple 28 shown in FIG. 8A, the second temperature sensor 2 may have a nipple 28 shown in FIG. 8B having a different thread diameter, a nipple 28 shown in FIG. 8C having a different thread pitch, or a nipple 28 shown in FIG. 8D having a different thread length, for example.

Figure 9A:
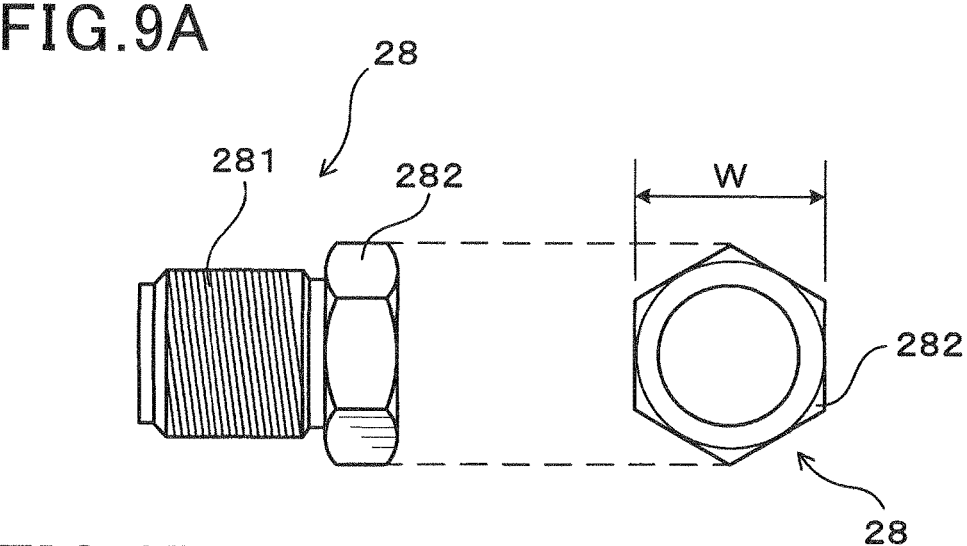
FIGS. 9A-9C show side views and plan views of three nipples having differences in hexagonal portions in the fourth embodiment.
Figure 9B:
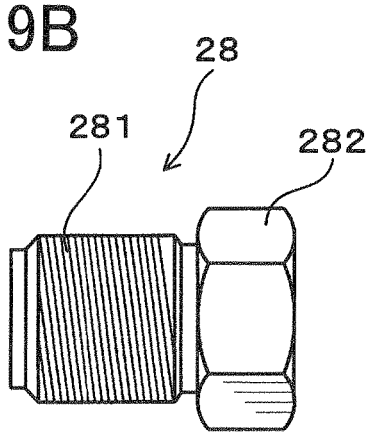
Figure 9C:
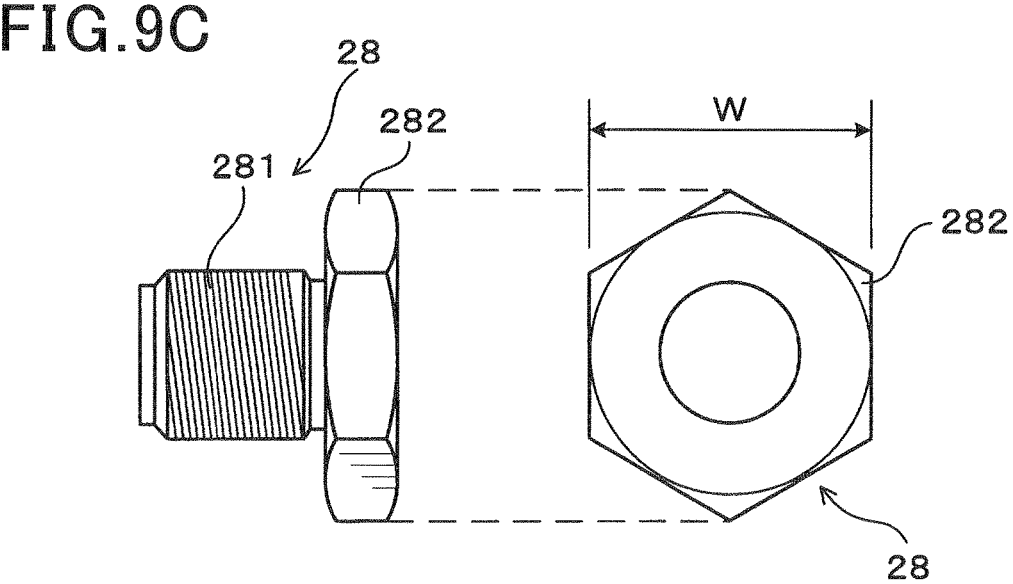

Alternatively, the difference in the shape of the nipple 28 in the two temperature sensors 2 may be a width of the hexagonal portion 282 in the axial direction or a hexagonal width across flat W, as shown in FIGS. 9A, 9B, and 9C.

Here, the hexagonal width across flat W refers to a width between a pair of side surfaces of the hexagonal section 282 that are parallel to each other, as shown FIG. 9A and FIG. 9C.

Other details are the same as the third embodiment.

In the present embodiment, it is possible to configure the differences that are easy to identify.

In particular, by using the diameter of the threaded portion 281, the thread pitch, or the hexagonal width across flat W of the nipple 28 or the like as the difference, it is possible to reliably prevent false assemblies.

Other functions and effects are the same as those of the third embodiment.

Fifth Embodiment

Figure 10A:
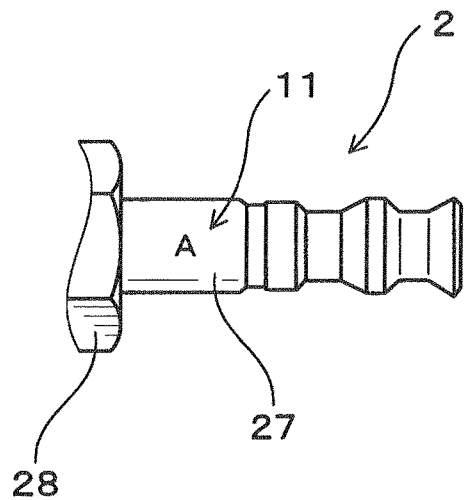
FIGS. 10A, 10B show side views of parts of the two temperature sensors having differences in markings in a fifth embodiment.
Figure 10B:
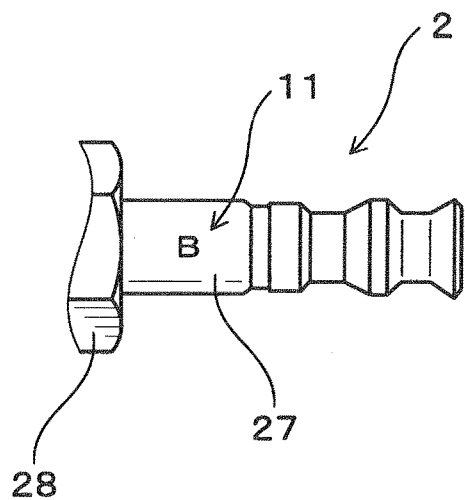

The present embodiment is that the difference of the two temperature sensors 2 may be markings 11 with an identifiable appearance marked on the temperature sensors 2, as shown in FIGS. 10A and 10B.

In the present embodiment, the marking 11 is formed on an outer surface of a portion exposed from the nipple 28 of the protective tube 27.

The marking 11 may be a character or a symbol formed by recessing a part of the protective tube 27 made of metal, for example, as shown in FIGS. 10A, 10B.

Moreover, the marking 11 may be marked on one of the two temperature sensors 2, and not on the other one to configure the difference.

Other details are the same as the third embodiment.

In the present embodiment, since it is possible to provide the difference without changing the shape and size of the two temperature sensors 2, it is possible to reduce the types of parts. As a result, it is possible to reduce the manufacturing cost.

Other functions and effects are the same as those of the first embodiment.

Sixth Embodiment

Figure 11:
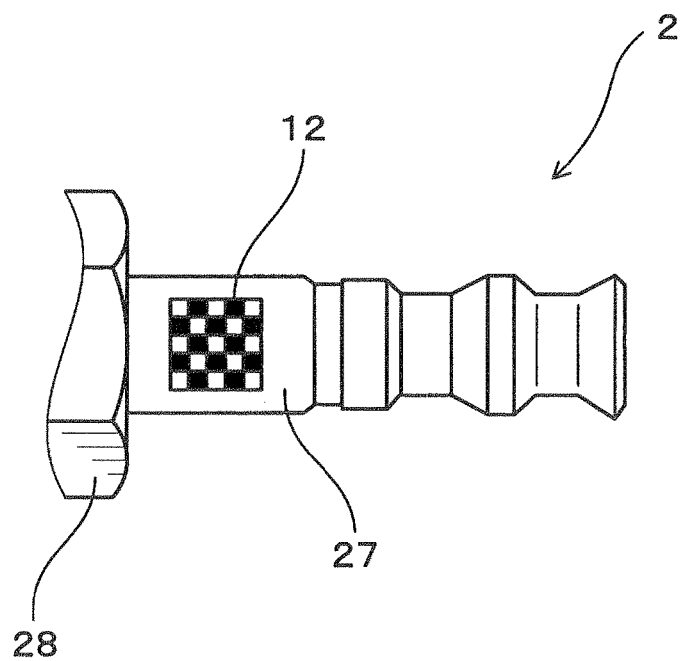
FIG. 11 shows a side view of a part of the temperature sensor with an optical reading code given in a sixth embodiment.

The present embodiment is that the difference of the two temperature sensors 2 may be an optical reading code 12 marked on the temperature sensors 2, as shown in FIG. 11.

In the present embodiment, the optical reading code 12 is printed on an outer surface of a portion exposed from the nipple 28 of the protective tube 27.

That is, the first temperature sensor 2 and the second temperature sensor 2 are given the different optical reading code 12, respectively, in the paired temperature sensor 1, for example.

A QR CODE (a registered trademark of Denso Wave Incorporated), or bar code, etc. can be used as the optical reading code 12, for example.

Other details are the same as the third embodiment.

In the present embodiment, it is possible to be able to read optical reading code 12 by a machine, thus the two temperature sensors 2 are identified reliably.

In addition, it becomes easy to automate the assembling of the paired temperature sensor 1 or the mounting of the paired temperature sensor 1.

Other functions and effects are the same as those of the third embodiment.

Seventh Embodiment

In the present embodiment is an example that temperature sensing portions 29 of the two temperature sensors 2 are configured to be the same length, shape, structure and the like as shown in FIGS. 12A-12D Here, the temperature sensing portion 29 is a portion projecting towards a distal end from the rib 25, and is a portion including the sheath pin 23 in the distal end side of the distal end of the rib 25 and the element protective cover 24 disposed at the distal end portion of the sheath pin 23.

Figure 12A:
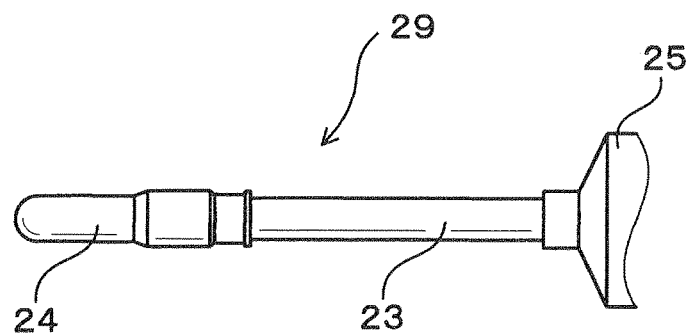
FIGS. 12A-12D show side views of two temperature sensing portion having differences in shapes and dimensions in a seventh embodiment.

That is, when it is assumed that the first temperature sensor 2 has the temperature sensing portion 29 shown in FIG. 12A, the other temperature sensing portion 29 of the second temperature sensor 2 must have the same shape, for example.

Figure 12B:
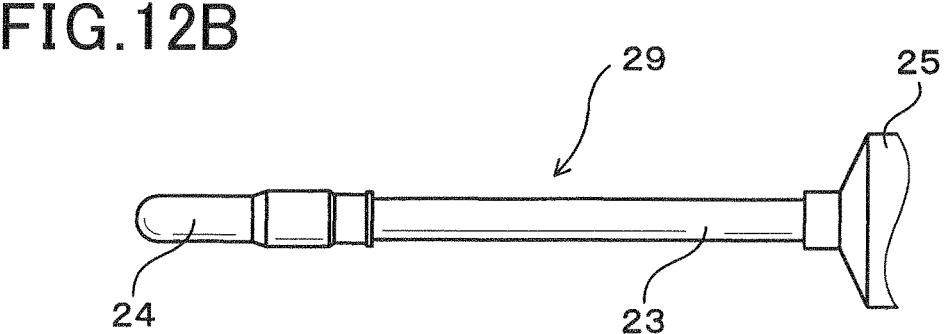
Figure 12C:
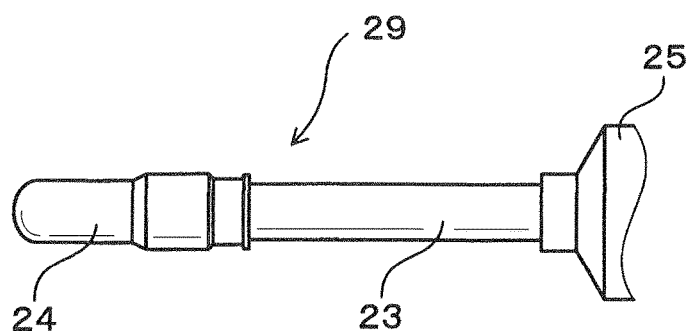

However, it can be assumed that the second temperature sensor 2 never has the temperature sensing portions 29 having different lengths as shown in FIG. 12B or the temperature sensing portion 29 having different thicknesses as shown in FIG. 12C.

The reason is that if the shapes of the temperature sensing portions are different, measuring positions (depth) or heat capacity of the two temperature sensors 2 become different, thus the measurement accuracy of the temperature difference drops.

Figure 12D:
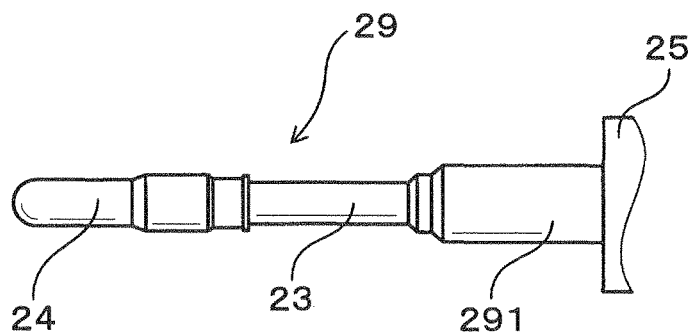

Alternatively, as shown in FIG. 12D, vibration suppression pipes 291 may be provided to the two temperature sensors 2.

However, the structure of the temperature sensing portions 29 of the two temperature sensor 2 should never be different.

Note, a base end portion of the vibration suppression pipe 291 is fixed on the rib 25, and a distal end portion of the vibration suppression pipe 291 is disposed at a predetermined position of the sheath pin 23 so as to face an outer peripheral surface of the sheath pin 23, thus it is configured to suppress the vibration of the sheath pin 23, that is, suppress the vibration of the thermosensitive element 21.

Other details are the same as the third embodiment.

In the present embodiment, since the temperature sensing portions 29 of the two temperature sensors 2 are in the same shape or the like, it means that the difference of the two temperature sensors 2 is provided by the other configuration.

Thus, it is possible to accomplish the same functions and effects as those of the third embodiment.

Eighth Embodiment

Figure 13A:
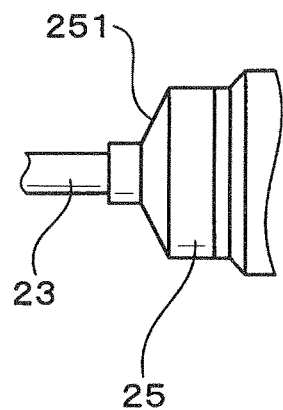
FIGS. 13A-13C show side views of three ribs having differences in shapes in an eighth embodiment.
Figure 13B:
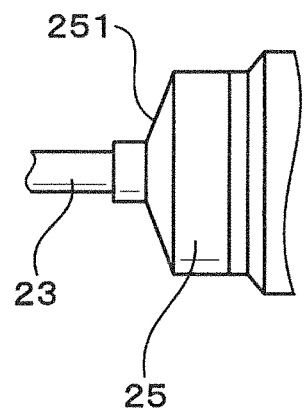
Figure 13C:
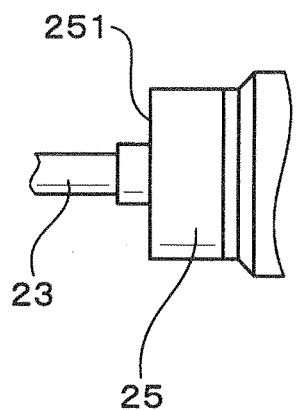

The present embodiment is an example that the difference of the two temperature sensors 2 is a difference in a shape of the rib 25, as shown in FIGS. 13A-13C.

That is, when assuming that the first temperature sensor 2 has a rib 25 shown in FIG. 13A, the second temperature sensor 2 may have a rib 25 shown in FIG. 13B having different diameter, or a rib 25 shown in FIG. 13C having a different shape of a seat surface 251, for example.

Here, the seat surface 251 is a surface pressed against a fastening position for mounting the temperature sensor 2 towards the distal end side in the axial direction.

Further, the rib 25 shown in FIG. 13A has a tapered seat surface 251, and in the rib 25 shown in FIG. 13C, the seat surface 251 is formed to a flat surface that is perpendicular to the axial direction.

Other details are the same as the third embodiment.

In the case of the present embodiment, it is possible to accomplish the same functions and effects as those of the third embodiment.

Ninth Embodiment

Figure 14A:
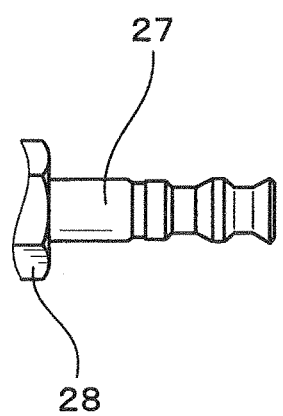
FIGS. 14A-14C show side views of three protective tubes having differences in shapes in a ninth embodiment.
Figure 14B:
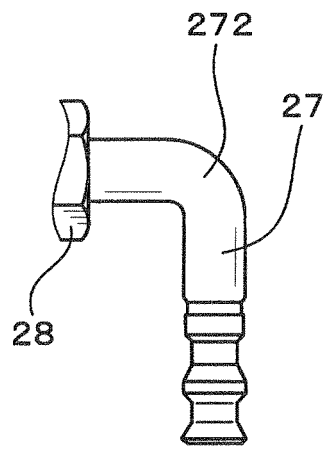
Figure 14C:
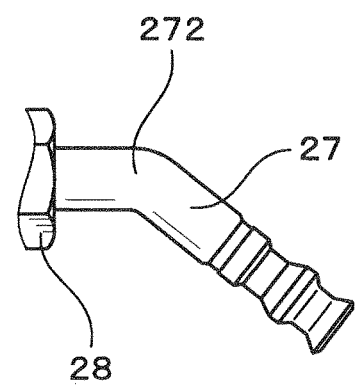

The present embodiment is an example that the difference of the two temperature sensors 2 is a shape of a portion protruding toward the base end side of the nipple 28 of the protective tube 27, as shown in FIGS. 14A-14C.

That is, when assuming that the first temperature sensor 2 has a straight-shaped protective tube 27 shown in FIG. 14A, the second temperature sensor 2 may have a protective tube 27 having a bent portion 272 as shown in FIG. 14B or FIG. 14C, for example.

Further, as shown FIG. 14B and FIG. 14C, the temperature sensors 2 on the upstream side and the downstream side can also be distinguished by the differences of bending angles of the bent portions 272.

Alternatively, in the embodiment of FIG. 14A, they can be distinguished by the differences in a protruding length of the protective tube 27 from the nipple 28 towards the base end side, or in the embodiments of FIG. 14B and FIG. 14C, they can also be distinguished by the differences in a length from the bent portion 272 towards the base end side.

Other details are the same as the third embodiment.

In the case of the present embodiment, it is possible to accomplish the same functions and effects as those of the third embodiment.

Tenth Embodiment

Figure 15A:
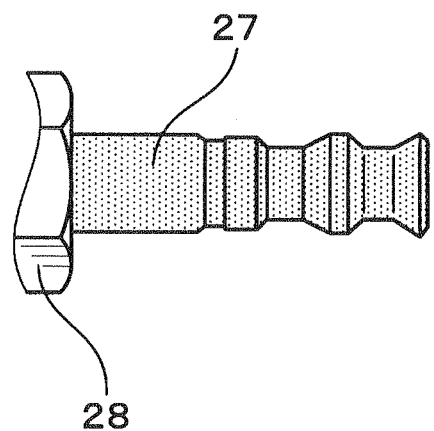
FIGS. 15A, 15B show side views of two protective tubes having differences in surfaces in a tenth embodiment.
Figure 15B:
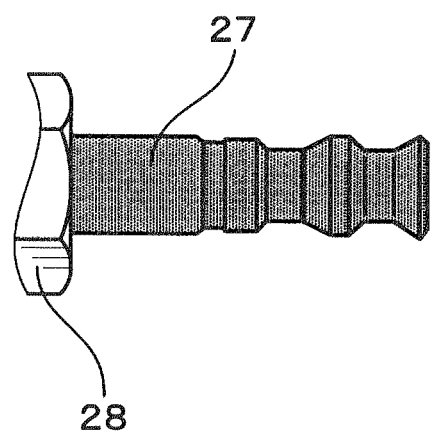

The present embodiment is an example that the difference of the two temperature sensors 2 is the difference in a surface finish condition of the protective tube 27, as shown FIGS. 15A and 15B.

That is, as shown in FIGS. 15A and 15B, the two temperature sensors 2 can be distinguished by the difference of the surface gloss or the like of the protective tube 27, for example.

Other details are the same as the third embodiment.

In the case of the present embodiment, it is possible to accomplish the same functions and effects as those of the third embodiment.

Eleventh Embodiment

The present embodiment is an example is that the difference of the two temperature sensors 2 is an appearance of the wire tube 220 that covers the lead wire 22 or the pair of lead wires 22, as shown in FIGS. 16A-16F.

The difference in appearance of the wire tube 220 or lead wire 22, for example, can be with or without patterns, colors, accessories, or shapes, mounting positions, the mounting numbers.

Figure 16A:
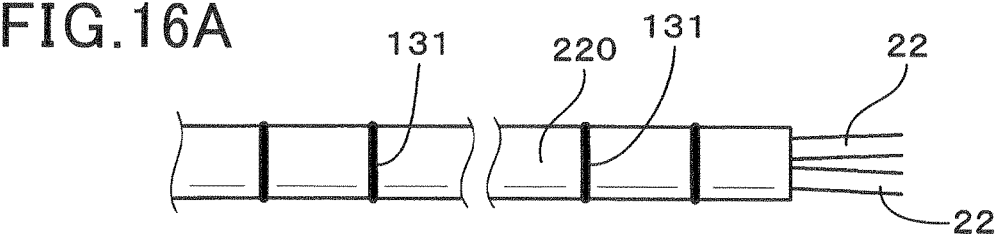
FIGS. 16A-16F show side views of six lead wires having differences in patterns and accessories in an eleventh embodiment.
Figure 16B:
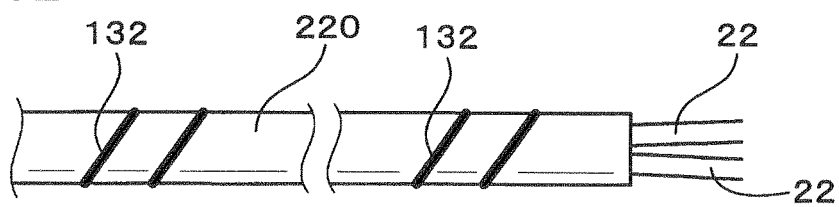

For example, the differences between the first temperature sensor 2 and the second temperature sensor 2 can be the difference pattern 131 given to the wire tube 220, as shown in FIGS. 16A and 16B.

Figure 16C:
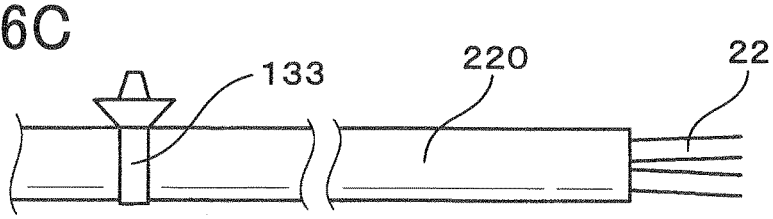
Figure 16D:
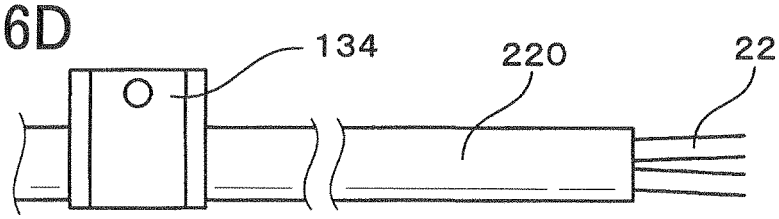

In addition, it is also possible for the difference to be colors, shapes, mounting positions or number of mounting pieces of accessories of the wire tube 220 such as the band 133 or the bracket 134 as the difference, as shown in FIGS. 16C and 16D.

Figure 16E:
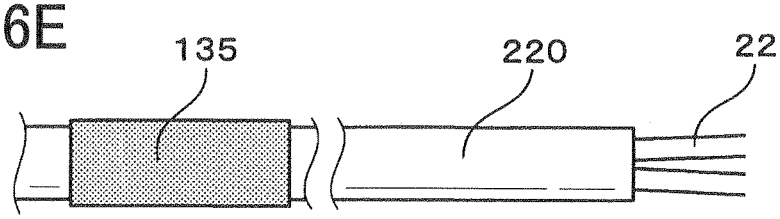
Figure 16F:
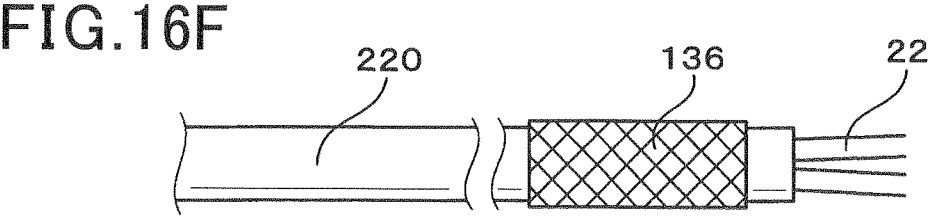

Alternatively, it is also possible for the difference to be colors, shapes, mounting positions or number of mounting pieces of accessories of the wire tube 220 such as the heat-shrinking tube 135 or a flex guard 136 as the difference, as shown in FIGS. 16E and 16F.

Other details are the same as the third embodiment.

In the case of the present embodiment, it is possible to accomplish the same functions and effects as those of the third embodiment.

Twelfth Embodiment

Figure 17:
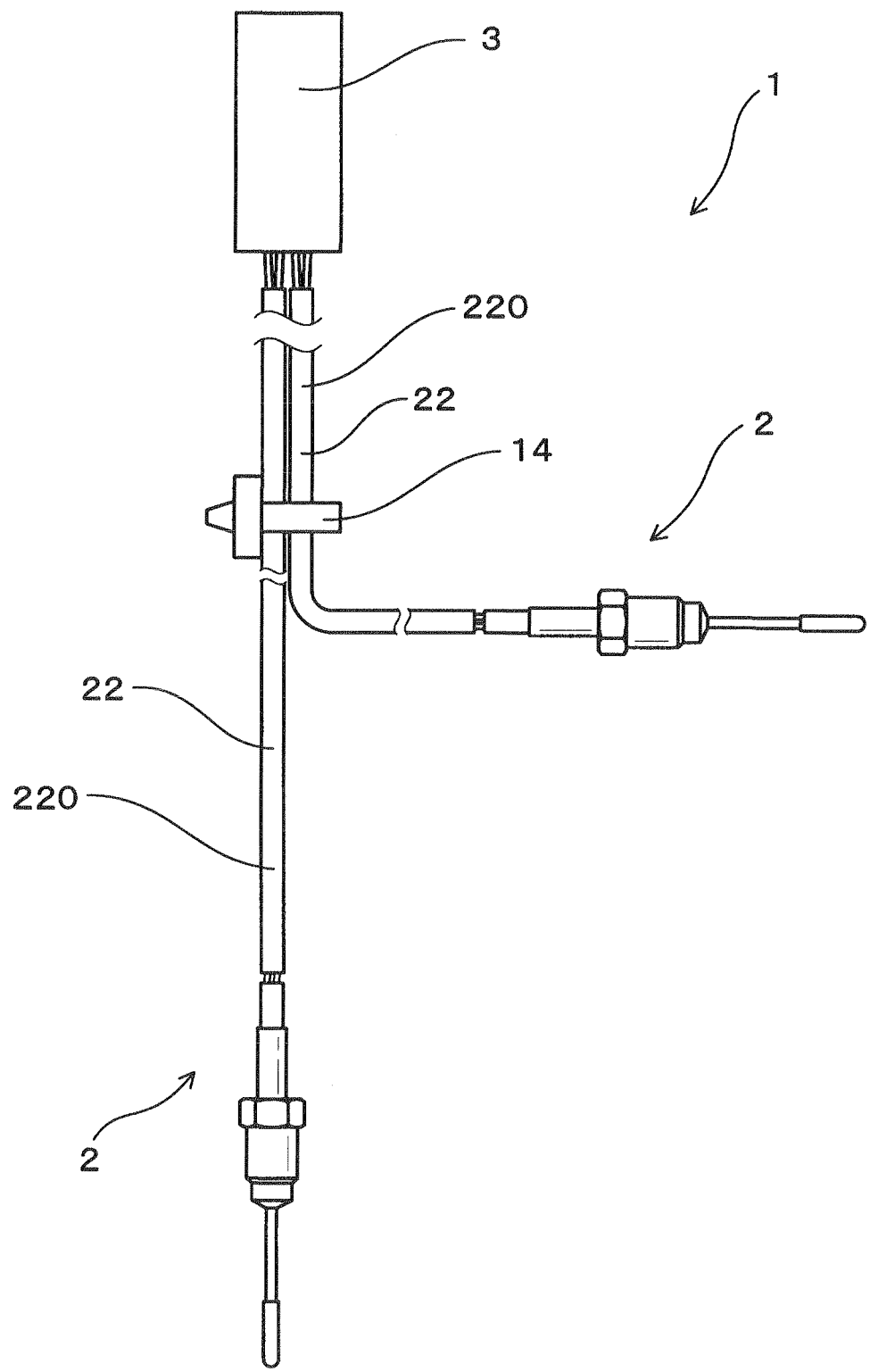
FIG. 17 shows an overall view of a paired temperature sensor of which wire tubes of lead wires are bundled by a band in a twelfth embodiment.

As shown in FIG. 17, the present embodiment is an example of a paired temperature sensor 1 that has the wire tubes 220 of the two temperature sensors 2 bundled by a band 14.

The pair of the lead wires 22 of each temperature sensor 2 is covered and bundled by each wire tube 220.

Then, although the two wire tubes 220 that each covers the pair of the lead wires 22 are led out from the connector 3 in the paired temperature sensor 1, the lead wires 22 (wire tubes 220) are bundled by the band 14 in a middle portion between the connector 3 and the temperature sensors 2.

Other details are the same as the third embodiment.

In the present embodiment, when the mounting position of the two temperature sensors 2 and the control unit such as the ECU (engine control unit) are separated, problems like the wire tubes 220 intertwining or catching other parts or the like when connecting wires can be avoided, and since a plurality sensors do not intertwine with each other when being transported or stored, there is an advantage that the handling becomes easier.

Thirteenth Embodiment

The present embodiment is an example to examine a preferable maximum indicated temperature differences relative to the same temperature of the two temperature sensors 2 when applying the paired temperature sensor 1 to determine the catalyst deterioration in the catalytic converter.

That is, in the present embodiment, the paired temperature sensor 1 that has the indicated temperature differences relative to the same temperature of the two temperature sensors 2 of 10 degrees C., 5 degrees C., and 3 degrees C. are prepared by selecting the thermosensitive element 21 having different electrical characteristics among the plurality of the thermosensitive element 21 manufactured in the element manufacturing process.

Then, the pair of the temperature sensors 2 of the paired temperature sensor 1 is disposed on the upstream side and the downstream side of the catalytic converter in the exhaust system of an engine bench, and judgment tests that measure the temperature differences between the two temperature sensors 2 are performed.

Upon testing, a new catalyst and a deteriorated catalyst are used for one paired temperature sensors 1, and the temperature differences are measured by replacing the mounting positions of the temperature sensors 2 in the upstream side and the downstream side of the catalytic converter, respectively.

That is, measurement of disposing one of the temperature sensors 2 on the upstream side of the catalytic converter with the new catalyst and the other one of the temperature sensors 2 on the downstream side, respectively (first measurement), and another measurement of disposing the temperature sensors 2 on reversed positions with respect to the first measurement (second measurement) are performed.

In addition, measurement of disposing one of the temperature sensors 2 on the upstream side of the catalytic converter with the deteriorated catalyst and the other one of the temperature sensors 2 on the downstream side, respectively (third measurement), and another measurement of disposing the temperature sensors 2 on reversed positions with respect to the first measurement (fourth measurement) are performed.

Then, qualities of each paired temperature sensor 1 are judged to determine whether the indicated temperature differences of the paired temperature sensor 1 in any of the first and second measurements are within a predetermined range that are acceptable for the new catalyst, and whether the indicated temperature differences of the paired temperature sensor 1 in any of the third and fourth measurements exceeds the predetermined value for the deteriorated catalyst.

As a result, in the paired temperature sensor 1 with the indication temperature differences with respect to the same temperature of 10 degrees C., there are occasions that a deterioration signal is outputted in the first and second measurements even though the new catalyst is used, and a normal signal is outputted in the third and fourth measurements even though the deteriorated catalyst is used.

That is, it is found that there is a chance of malfunctioning if any two thermosensitive elements 21 of this class are selected.

In contrast, in the paired temperature sensor 1 with the indicated temperature differences with respect to the same temperature within 3 degrees C. or 5 degrees C., it is confirmed that the normal signal can be obtained from either catalyst, and even if the mounting positions are replaced.

Although the temperature difference sensitivity of the paired temperature sensor is enhanced when the temperature characteristics of the two temperature sensors 2 are closer, the number of classification may be increased, thus resulting in increased manufacturing costs.

As a conclusion, from the point of view of cost-effectiveness, a combination of thermosensitive elements 21 with the temperature difference characteristics (indicated temperature differences with respect to the same temperature) of less than 5 degrees C. is desirable.

Accordingly the plurality of the embodiments mentioned above can be appropriately combined with each other.

Thereby, it is possible to exert functions and effects synergistically accomplished by each embodiment.

What is claimed is:

1. A paired temperature sensor comprising:
   two temperature sensors having electrical characteristics substantially equivalent at the same temperature range, each of the temperature sensor having a thermosensitive element therein that changes its electrical characteristics according to temperature, and a pair of lead wires;
   a single connector to which the two temperature sensors are connected via the lead wires;
   positioning portions for allowing the connector to be connected in a predetermined orientation relative to a counterpart connector; and
   at least one distinguishing difference between the two temperature sensors, wherein,
   indicated temperature differences relative at the same temperature of the two temperature sensors are less than 5 degrees C. in a measured temperature range of at least more than or equal to 200 degrees C. and less than or equal to 850 degrees C.

2. The paired temperature sensor according to claim 1, wherein,
   the thermosensitive element is a thermistor element whose electrical resistance varies according to the temperature.

3. The paired temperature sensor according to claim 1, wherein,
   the thermosensitive element is a thermistor element whose electrical resistance varies according to the temperature.

4. The paired temperature sensor according to claim 1, wherein,
   the difference of the two temperature sensors is a difference in lengths of the lead wires.

5. The paired temperature sensor according to claim 1, wherein,
   the two temperature sensors are different in the shape of a nipple that is for fastening the temperature sensor to a measuring point.

6. The paired temperature sensor according to claim 1, wherein,
   the two temperature sensors are different in a marking with an identifiable appearance marked at least on one of the temperature sensors.

7. The paired temperature sensor according to claim 1, wherein,
   the two temperature sensors are provided with different optical reading codes marked on the temperature sensor.

8. The paired temperature sensor according to claim 1, wherein the positioning portions are grooves formed in a wall of the connector.

9. The paired temperature sensor according to claim 1, wherein the counterpart connector includes protrusions that mesh with the positioning portions.

* * * * *